Figure 1:
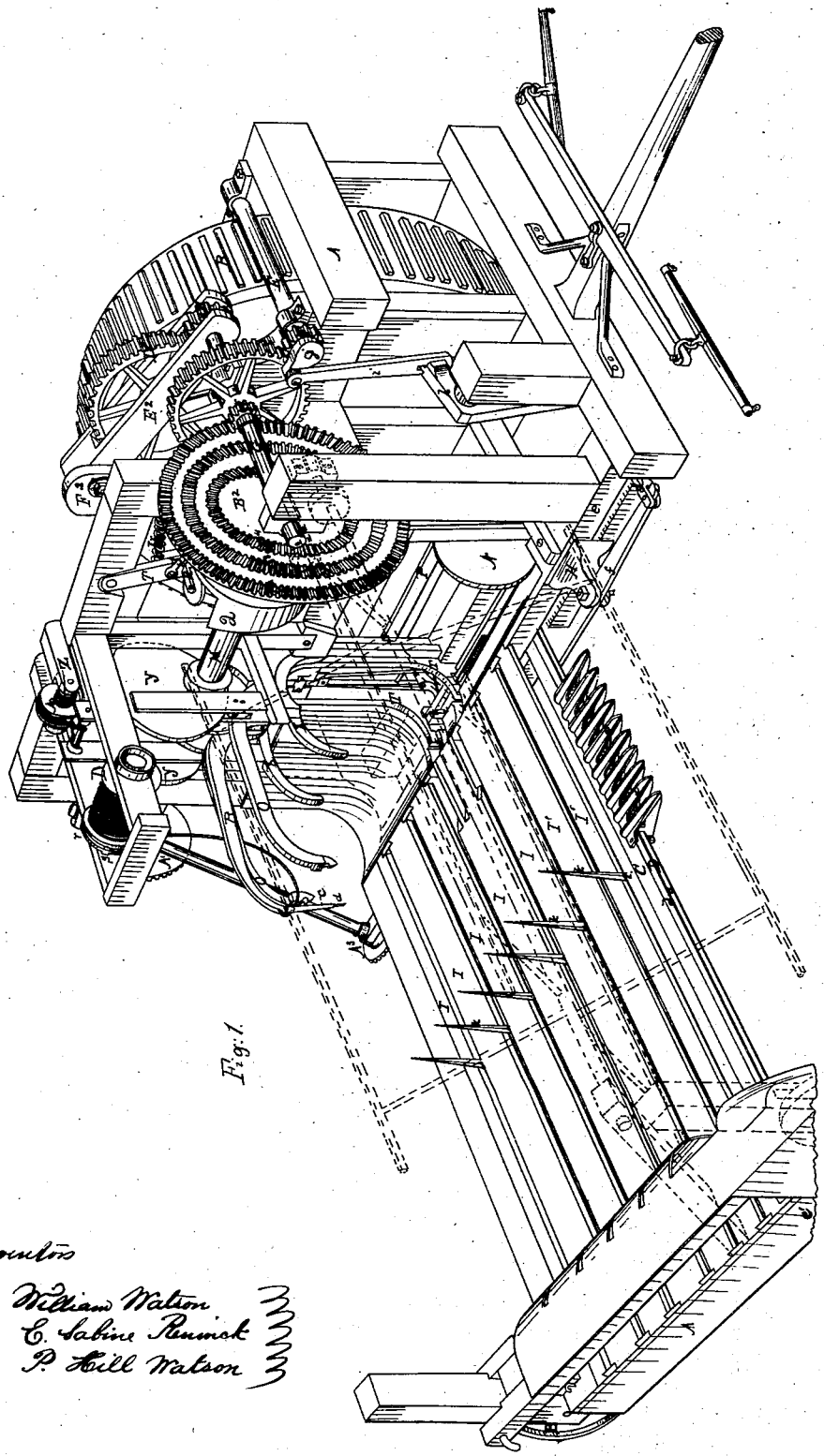

4 sheets—Sheet 1.

W. WATSON, E. S. RENWICK & P. H. WATSON.
GRAIN HARVESTER AND BINDER.

No. 8,083.        Patented May 13, 1851.

Inventors
William Watson
E. Sabine Renwick
P. Hill Watson

W. WATSON, E. S. RENWICK & P. H. WATSON.
GRAIN HARVESTER AND BINDER.
No. 8,083.  Patented May 13, 1851.
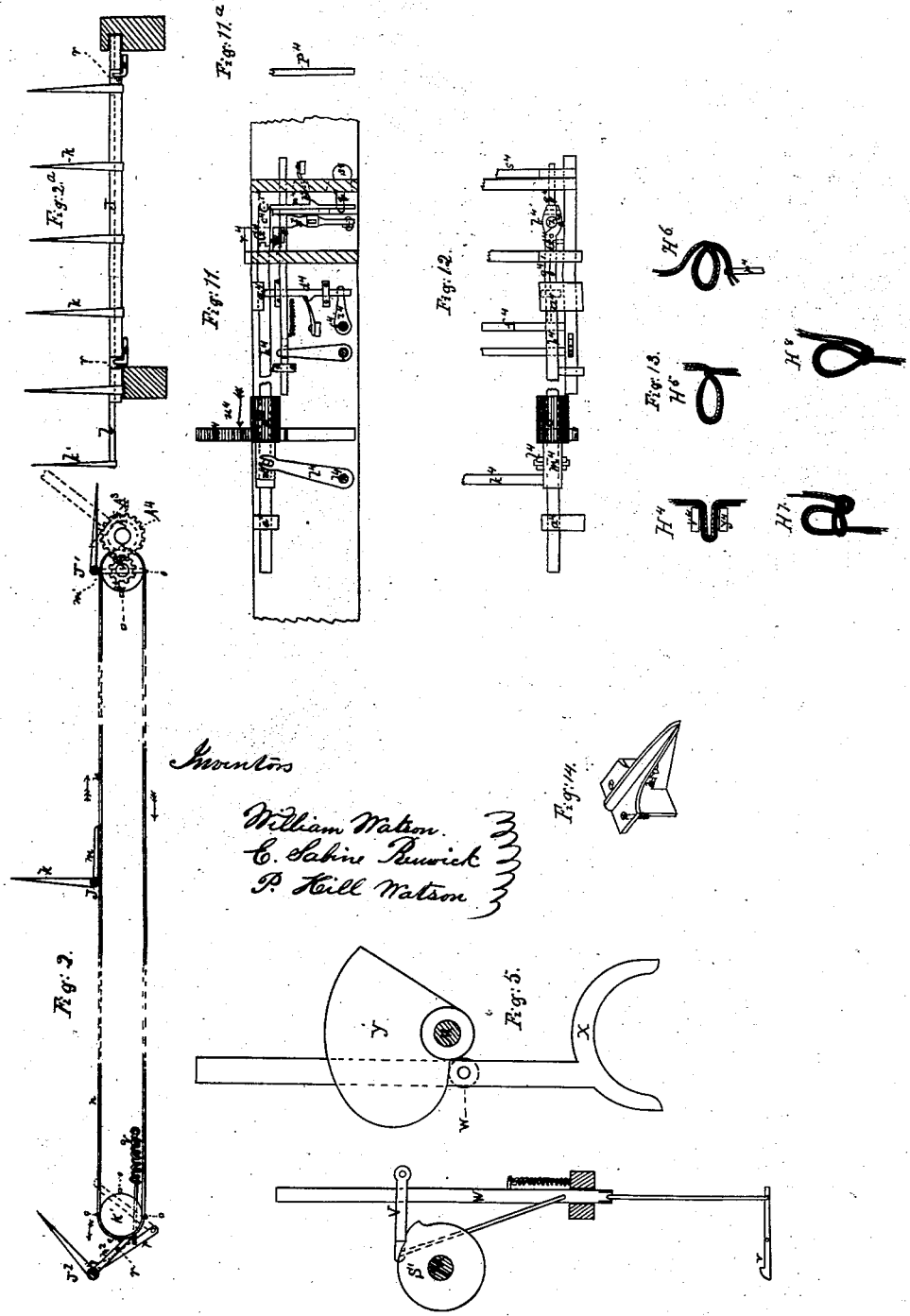

W. WATSON, E. S. RENWICK & P. H. WATSON.
GRAIN HARVESTER AND BINDER.
No. 8,083. Patented May 13, 1851.
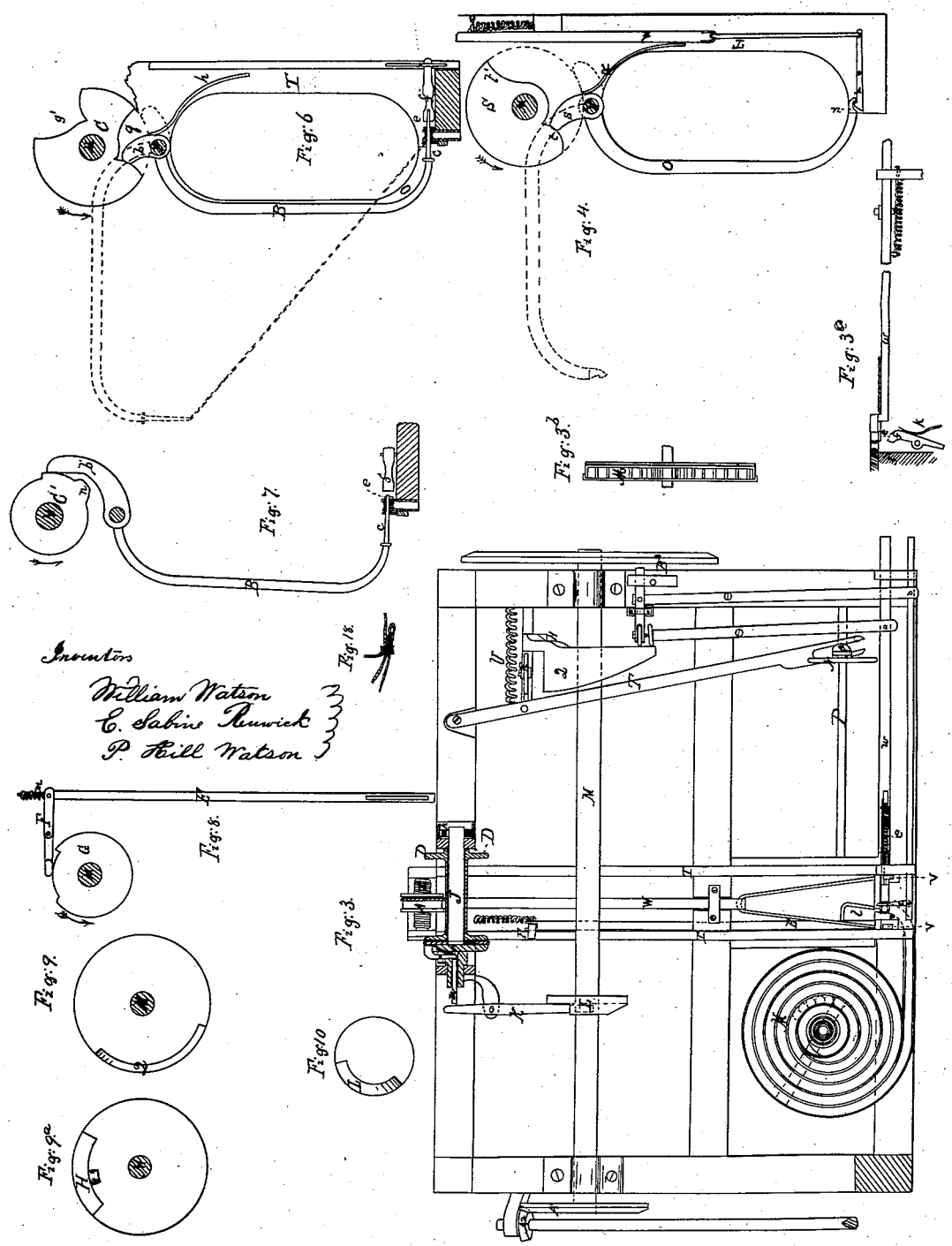

W. WATSON, E. S. RENWICK & P. H. WATSON.
GRAIN HARVESTER AND BINDER.
No. 8,083. Patented May 13, 1851.
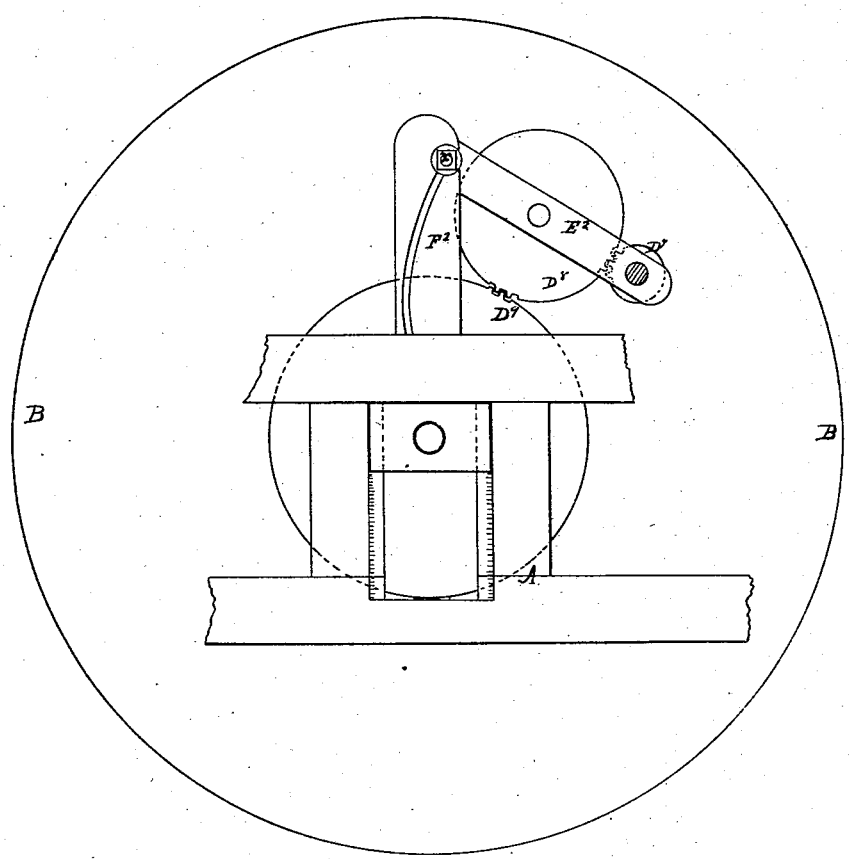

UNITED STATES PATENT OFFICE.

WILLIAM WATSON, OF CHICAGO, ILLINOIS, AND E. SABINE RENWICK AND P. HILL WATSON, OF WASHINGTON, DISTRICT OF COLUMBIA.

IMPROVEMENT IN GRAIN HARVESTERS AND BINDERS.

Specification forming part of Letters Patent No. 8,083, dated May 13, 1851.

*To all whom it may concern:*

Be it known that we, WILLIAM WATSON, of Chicago, in the county of Cook and State of Illinois, and E. SABINE RENWICK and P. HILL WATSON, of Washington city, in the District of Columbia, have invented certain new and useful Improvements in Machines for Harvesting Grain, of which the following is a full, clear, and exact description, reference being had to the accompanying drawings, which form part of this specification, and in which—

Figure 1 is a view in perspective of our harvester. Fig. 2 is a side elevation of the raking apparatus. Fig. 3 is a face elevation of the binding apparatus, and Figs. 4, 5, 6, 7, 8, 9, and 10 are views of detached portions of the same. Figs. 11 and 12 are views of the cord-tying apparatus, and Fig. 13 represents the knot in the various stages of its formation. Fig. 14 is a view in perspective of one of the fingers, and Fig. 15 is an elevation of a portion of the driving machinery.

Whereas in harvesting-machines as generally constructed the grain cut by the sickle or knife is discharged from the machine either by hand or by power, and is subsequently bound into sheaves, either wholly by hand or by the joint action of manual labor and mechanical devices, now the first part of our invention consists in binding the grain cut by the sickle into sheaves without manual labor, and by mechanism whose motion is derived from, and is dependent upon, the motion of the harvesting-machine.

The second part of our invention, which is not necessarily connected with the first, but may be used with advantage in ordinary machines, consists of a raking apparatus, by means of which the grain cut by the sickle is collected at suitable intervals at one extremity of the platform on which the cut grain is received.

Our invention consists, further, in various mechanical contrivances, which will be hereinafter more particularly described.

In order to elucidate the nature of our invention, we have represented in the accompanying drawings a harvesting-machine consisting of a cutting, a raking, and a binding apparatus, which are so constructed, arranged, and combined that they work in connection and constitute a machine by which the several operations of cutting, raking, and binding grain are all effected automatically by the movement of the machine.

The cutting apparatus consists of a reciprocating sickle operating in connection with fingers, which enter the standing grain as the machine is advanced against it.

The raking apparatus consists of a series of teeth secured to a rake-head, which can be lengthened or shortened to suit the length of the grain cut by the sickle, of a pair of endless chains by means of which the rake-head is made to traverse the platform on which the cut grain falls, and of the mechanical devices by whose action the rake-teeth are depressed beneath the level of the platform when the rake-head is passing in one direction, and are raised above it when the rake-head is moved in the reverse direction.

The binding apparatus is made up of a series of mechanical devices or movements, which effect the following operations—viz., seizing the grain delivered by the rake, compressing it into a bundle of proper size, or a "sheaf," as it is usually called, surrounding it with cord from a spool or reel, joining or tying the extremities of that portion of cord which encircles the sheaf, severing it from the rest of the cord, and, finally, delivering the bound sheaf from the machine, all of which operations are effected by mechanical devices, which are put in motion by the wheels that support the harvesting-machine as they are turned by drawing it forward.

In the accompanying drawings, A is the frame of the machine, to which the other portions are attached. It is supported on two or more running wheels, B B', one of which, B, is the driver, or that from which motion is imparted to the acting members of the machine. The others, B', are smaller, and merely support the weight of that portion of the machine which bears upon them. Each wheel is mounted upon an arbor, whose journals turn in boxes, which are constructed to move vertically in slides in such manner that the frame can be set at a greater or less distance from the ground at will.

The frame consists, mainly, of two sections, one of which sustains the binding apparatus and the mechanical devices by means of which motion is imparted to the cutting, raking, and binding apparatus from the driving-wheel, which is also attached to this portion of the frame. The other section of the frame forms the platform on which the cut grain falls, and from which it is gathered by the rake, which traverses the platform and delivers the grain to the binding apparatus.

The cutting apparatus is composed of a cutter-bar, C, and sickle D. The former is fitted at its front edge with a series of teeth, $a$, which project beyond it into the standing grain. These teeth are of the form represented at Fig. 14, having an opening, $b$, in their lower rib, through which the sickle moves. The latter consists of a flat bar or cutter-rod, $c$, which extends through the whole series of fingers $a$, and is furnished at its upper side with knives $d$, whose edges extend beyond the front of the bar, and are sickled or serrated in order that they may cut the grain received between the fingers with greater facility. The cutter-bar, with the fingers and sickle, is supported at its extremities in grooves in the bars $e$ $e'$ of the main frame, in which it can be moved so as to set it at a greater or less distance from the center of the raking-platform behind it, thus adapting it to the length of grain which is to be cut.

The cutter-rod $c$ is connected with one extremity of a lever, $f$, whose opposite extremity is connected by a rod, $g$, with a bell-crank, $h$, to which a reciprocating motion is imparted through the intervention of a rod, $i$, by a crank, $j$, on the extremity of a counter-shaft, E. The latter is supported in boxes on the main frame, and is fitted with a pinion, F, whose teeth engage with those of a cog-wheel on a shaft, G, which is driven by the driving-wheel B, the arrangement and construction of this series of connecting-rods, levers, and cranks being such that as the crank $j$ revolves the cutter-rod is forced to move to and fro or vibrate rapidly in the direction of its length. The standard H, which supports the center of the lever $f$, is adjustable upon the frame, so that it can be shifted along the frame to set it to the different positions in which the cutter-bar may be placed, in which case the lever $f$ can be removed and replaced by another of the proper length to suit the positions of the standard and cutter-bar. In order to facilitate the operation of the sickle, a reel should be used, by means of which the cut grain will be laid evenly upon the raking-platform. Such a reel is represented in Fig. 1, its shaft being fitted with a belt-pulley, to which a belt is applied, by means of which the reel is caused to revolve as the harvester is moved forward.

The raking-platform on which the grain falls is formed of slats I I', which are set at a sufficient distance apart to allow the rake-teeth $k$ to traverse between them. Those slats I I' which are nearer the cutter-bar are removable, so that they can be removed when the cutter-bar C is set nearer the back of the machine and replaced when it is set nearer its front. The rake-teeth $k$, which project through the spaces between the slats I I', are all secured to a common rake-head, J, (see Fig. 2,) which extends transversely beneath the slats. The front rake-tooth, $k'$, is secured to the front extremity of a bar, $l$, which slides in a groove in the rake head, so that it can be set at a greater or less distance from the back of the raking-platform to make it conform to any position in which the cutter-bar C may be set. An arm is secured to each extremity of the rake-head. These arms are secured at their outer extremities to a pair of endless chains, $n$, which are supported upon rollers K K'. The chains are moved by turning the roller K nearer the driving-wheel. This roller is furnished with pins $o$, which project from its periphery and engage with the links of the chains, thus causing the pair of chains to move with equal velocities. As the chains are moved in the direction indicated by the arrows in the drawings, the rake-head is alternately drawn by the arms $m$ toward the driving-wheel end of the platform, and moved away from it. When it is drawn toward this end, the arms are horizontal, as represented at $m$, Fig. 2, and hence the rake-teeth are forced to project upward through the spaces between the slats. As the chains are moved by the roller K, those portions of them to which the arms M are attached pass round the roller. By this movement the arms of the rake-head are brought to the positions in which they are delineated at $m'$, Fig. 2. The rake-head is turned, and the rake-teeth are depressed beneath the surface of the raking-platform. As then the chains continue to move, the rake-head, with its teeth in this depressed position, is moved to the opposite extremity of the platform, where the portions of the chains to which the arms are attached pass up round the other roller, K'. As they pass round this roller, the arms $m$ are brought again to a horizontal position, the rake-head is turned, and the teeth are turned up or protruded in an erect position through the spaces between the slats of the platform.

In order to facilitate the upturning of the rake-teeth, two bars, $p$, are pivoted to the main frame beyond the second roller, K'. These are maintained in the positions in which they are delineated in dotted lines at Fig. 2, by springs $q$. A pin, $r$, is projected from the outer side of each of the arms $m$ of the rake-head. These pins come in contact with the bars $p$ when the rake-head nears the limit of its track, and force them to move in the direction indicated by the arrow in Fig. 2. As they move, their upper extremities strike the rake-head and move it beyond the roller K', thus assisting the action of the endless chains, and as the rake-head J begins to move toward the opposite end of the platform the pins $r$ are carried away from the bars $p$, which are returned by the springs to their first position. When the teeth are moving in an erect position toward the driving-wheel, they gather the grain lying upon the platform and convey it toward the driving-wheel end of the raking-platform, where the binding apparatus is situated.

The binding apparatus seizes the grain collected by the rake-teeth, binds it into a sheaf, and ejects it from the machine. It is composed of a series of mechanical devices, which are all actuated at the proper moment by cams secured to a common rotating cam-shaft. The first of these devices consists of a pair of arms, which embrace the heap of grain delivered by the rake and hold it firmly while the rake is collecting a sufficient quantity of grain to form the next sheaf. The second device consists of a pair of squeezers, which compress the cut grain embraced by the arms into a round bundle of the proper diameter to form a sheaf. The third device is a finger, by means of which the compressed bundle is encircled with cord. The fourth is the apparatus for uniting the extremities of that portion of the cord which surrounds the bundle, and the fifth consists of a discharger, which ejects the bound bundle of grain or sheaf from the machine. There are also other auxiliary devices which assist the principal ones above mentioned. These will be described in the order in which they act.

In the drawings hereunto annexed, M is the cam-shaft, which is supported in suitable pillow-blocks, N, on the frame of the machine, and is fitted with a series of cams, which I prefer to cast fast to it. The arms and squeezers are situated at equal distances on each side of a line passing through the center of the raking-platform. The arms O O are constructed of bars of iron bent to the form represented in the drawings. They are connected together at their upper extremities by a shaft, P, which is supported in boxes $n$ on standards secured to the frame of the machine. This shaft is fitted with a toe, $s$, which projects above it, and is actuated by the cam S on the driving-shaft. This cam is of the form represented at Fig. 4, a large portion of its rim being concentric with its axis. As it revolves, the curved portion $t$ strikes the toe $s$, and, turning the arm-shaft P, raises the arms to the position in which they are represented at Fig. 1. They are retained in this position during the time the concentric portion of the periphery of the cam is passing the toe; but as soon as the curved part $t'$ passes the end of the toe $s$ the latter, with the arm-shaft and arms, is free to move back to its first position. This downward movement of the arms is assisted by a spring, R, which is of sufficient strength to force the arms to embrace the grain delivered by the rake between their inner faces and the corresponding faces of a series of stationary ribs, T, which form a cradle to support the grain. The outer extremities of the arms O have hooks $u$ secured to them, which engage with a pair of spring-hooks, $v$, pivoted to the frame of the machine. These prevent the arms from rising during the action of the squeezers, but, when the sheaf is completed, are disengaged from the hooks of the arms to allow the latter to be raised. This movement of the spring-hooks is effected at the proper moment by a cam, S', on the cam-shaft, which acts upon a lever, V, that is connected with the spring-hooks by a forked rod, W. The spring $x$, by means of which the hooks are maintained in contact with the arms, also acts upon this forked rod.

The squeezers X X are moved in a vertical direction by the pair of cams Y Y. These act upon friction-wheels $w$, which are pivoted to the shanks of the squeezers. The cams act to depress the squeezers upon the grain embraced by the arms O, and hold them in their depressed position while the binding is effected. The squeezers are maintained in their depressed positions until the concentric portions of their cams pass the friction-wheels, when they are raised to their first positions by the action of a spring, Z. The latter is wound upon the shaft of a drum, A, which is supported by brackets at the upper part of the frame. The upper extremities of the squeezer-shanks are connected together by a bar, to which a cord, $a$, is secured, which is wound upon and secured to the drum A. As the squeezers are depressed by the cams Y, the cord is drawn off from the drum A, which, being thus turned, winds up the spring on its shaft. As soon as the cams Y pass the friction-wheels $w$, the squeezers are free to move, and the spring turning the drum winds up the cord $a$ and draws them up to their first position.

The finger B, by means of which the compressed bundle is encircled with the binding-cord, is situated between the two arms O O, and is pivoted onto the arm-shaft P. It is fitted at its upper extremity with two toes, which are actuated by two cams on the cam-shaft. The one, C, acting upon the toe $b$, raises the finger when it has been depressed by a spring. The other, C', acting upon the toe $b'$, limits the distance to which the finger is depressed and aids in raising it. The outer extremity, $c$, of the finger is tubular, to admit the binding-cord $d$, which is wound upon a reel, D, at the upper part of the frame, and is inserted through the tubular extremity of the finger. The finger acts in combination with a spring-nippers, $f$, which seizes the extremity of the cord presented to it by the finger, and with a spring-slide, $e$, which seizes the bight of the cord after it has encircled the sheaf. It will be perceived that the cam C is a circular disk, in whose edge two notches, $g$ $g'$, are made. Whenever one of these passes the extremity of the toe $b$, the finger is depressed by a spring, $h$, and when the curved end of each notch strikes the toe $b$ the finger is raised, and is held in that position until the next succeeding notch passes the toe. The finger is thus twice depressed and twice raised by each revolution of the cam-shaft. The one of these operations take place before the rake presents the grain to the arms, and the second takes place immediately after the squeezers have compressed the grain to the proper size. When the finger first descends, its tubular extremity $c$ enters between the fixed $f'$ and movable jaws $f$, Figs. 3, 6, and 7, of the spring-nippers. When it descends the second time, the cam $C'$ is turned in such a position by the movement of the cam-shaft that the toe $b'$ strikes it, and prevents the extremity of the finger from touching the spring-nippers. The movable jaw of the latter is acted upon by a spring, $k$, which tends to keep it in contact with the fixed jaw $f'$. Its shank is passed through a frame, $l$, Fig. 3, on the lower extremity of a sliding bar, E, which is connected at its upper extremity with a lever, F, on which a cam, G, Fig. 8, acts. By the action of this cam G the sliding bar is forced downward, while it is drawn back to its raised position by a spring, $m$. One side of the frame $l$, through which the shank of the movable nipper-jaw passes, is inclined to the sliding bar, so that as the latter is drawn upward by the spring, this inclined side, bearing against the shank, opens the movable jaw, while as the sliding bar is depressed by the action of the cam G, this inclined side of the frame, as it passes by the shank, allows the movable jaw to be closed by the action of the sprink $k$. The cam G is of such form, and is set in such a position with respect to the cam C, that the nippers are open when the finger descends the first time, and as soon as the tubular extremity enters between the jaws, the movable one is closed upon it by the spring $k$. As then the finger is raised, the movable jaw, bearing against its tubular extremity, closes upon and holds the extremity of the binding-cord, which projects from the end of the finger B, and has been entered with it between the nipper-jaws, and as the finger is raised the cord, unwinding from the reel D, is extended from the nippers to the end of the finger, as represented in dotted lines at Fig. 6. This operation, as before stated, is effected before the rake presents the grain to the arms. As then the grain is delivered by the rake, it shoves the extended part of the cord before it into the cradle. The arms O then descend and embrace the grain, which is compressed by the squeezers X into a sheaf. As soon as the squeezers reach their lowest position, the second notch of the cam C passes the toe $b$, and the finger descends a second time; but as the cam $C'$ is now brought by the turning of the cam-shaft to a position where the toe $b'$ can strike its periphery, the finger is prevented from touching the spring-nippers, but is allowed to descend far enough to pass beyond the spring-slide $e$. The latter is now moved against it by the action of the cam H, and, bearing against the tubular extremity of the finger, seizes the bight or bend of the cord brought down by the finger as the latter is raised a second time by the cam C. In order that the spring-slide may seize the bight of the cord with certainty, it is advisable that the finger should rise slowly for a short distance. This slow movement of the finger is effected by a protuberance, $n$, on the cam $C'$, which, acting upon the toe $b'$, moves the finger until its extremity rises a short distance from the spring-slide, when its further movement is effected by the cam C. As the finger rises the second time, a knife, $i$, is moved against the cord to sever the portion encircling the sheaf, and held by the nippers and spring-slide from the rest of the cord, whose newly-cut extremity remains projecting about half an inch through the tubular end of the finger.

In order that the compressed sheaf may be tightly bound, it is essential that all the slack of the cord should be taken up when the finger descends the second time. This is effected by mounting the reel D upon an arbor, I, on which a spiral spring, $p$, is coiled. The latter tends to turn the arbor in a direction the reverse of that in which the reel is turned by drawing off the cord. The reel is fitted to turn loosely upon the arbor I, which is provided at one extremity with a disk, $r$. The latter has a spring-jaw, $s$, pivoted to it, whose bent head bears against the face of the adjacent head of the reel. The adjoining faces of the jaw and head of the reel are both roughened, or the jaw is roughened, and a disk, $t$, of some flexible substance (leather, for example) is secured to the head of the reel, so that when the jaw $s$ is in contact with the head it shall not slip, and hence the arbor is forced to turn with the reel, and thus to wind up the spiral spring. The journal of the arbor is tubular, and the shank of the jaw enters into the tubular space through a slot made for the purpose. A stem, $u$, is fitted into the tubular journal, which projects beyond its extremity and bears against one end of a lever, K, pivoted to the frame of the machine. The other extremity of this lever is actuated by a face-cam, L, on the cam-shaft, by means of which the lever is moved to force the stem $u$ against the shank of the spring-jaw, by which means its head is drawn out of contact with the reel-head, thus leaving the reel free to turn independent of the arbor. This face-cam is set on the cam-shaft in such a position with respect to the cam C that it allows the spring-jaw to secure the reel to the arbor after the cord-finger B has been depressed the first time. As then the cord is drawn off from the reel by the rising of the finger, the arbor is turned with the reel, and the spiral spring is wound upon it. The cord unwound is therefore strained by the tensive force exerted by the spring, which tends to turn the arbor and reel in the proper position to wind up the cord. When the arms seize the grain, more of the cord is drawn off, thus winding the spring still tighter. As the grain is compressed, its bulk is diminished, the cord which encircled it is slackened, and the slack is immediately rewound upon the reel by the action of the spring. This taking up of the slack is continued as the finger descends the second time, thus drawing the cord tightly round the compressed sheaf. As the finger rises the second time, leaving the bight of the cord fastened by the slide, the cam detaches the spring-jaw $s$ from the head of the reel just as the knife severs the cord. The spring then immediately unwinds and turns the arbor to its first position, while the reel, being loosely fitted upon the arbor, is no longer influenced by the spring, and hence the cord which extends through the finger is no longer strained.

In order to fasten the extremities of that portion of the cord which encircles the compressed sheaf and has been severed from the rest, they are secured in a metal eyelet in the following manner: The eyelet is fed by a spring-feeder, M, Figs. 3 and $3^b$, (of the same construction as the spring percussion-cap chargers in general use,) whose extremity is within the range of the tubular extremity $c$ of the finger, and immediately above the spring-slide $e$; hence, when the finger is depressed the first time, the end of the binding-cord is passed through the eyelet to be seized by the spring-nippers $f$. After the grain is compressed the finger, being depressed a second time, passes the cord a second time through the eyelet, and leaves the bight or bend secured by the spring-slide $e$. The eyelet and cord now occupy the positions in which they are represented at Fig. 18, both extremities of that portion of the cord which encircles the sheaf being through the eyelet. The bar $\omega$, to which the spring-slide $e$ is secured, is prolonged so that its end forms one of the sides of the extremity of the eyelet-tube. As the finger rises the second time, this bar is forced against the eyelet by the face-cam H on the cam-shaft, and thus flattening the eyelet, secures the two ends of the cord. As soon as the eyelet is compressed or flattened, the spring-slide $e$ and sliding bar $\omega$ are drawn back by a spring, $x$, the spring-nippers are opened, and the flattened eyelet containing the ends of the cord which encircles the sheaf is thus released. This is accomplished just before the squeezer-cams Y pass the friction-wheels $w$ and allow the squeezers to be drawn upward by their spring Z from the bound sheaf. As the squeezers are withdrawn from the sheaf, the latter tends to expand, and thus draws the flattened eyelet from the end of the eyelet-feeder through a slot made for that purpose. As soon as this is effected, the spring-hooks $v$ are disengaged by the action of the cam S' from the hooks on the arms O, which, being then free to move, are raised up by the action of their appropriate cam S upon the toe $s$ projecting from the arm-shaft P. The bound sheaf is thus left lying in the cradle, from which it is ejected by the action of the discharger. This discharger consists of a disk, N, which is sufficiently large to act upon the butt of the sheaf, and is secured to a sleeve, O'. The latter traverses on a bar, P. It is moved toward the back of the machine by a cam, Q, which acts, through the intervention of a lever, R, and rod S, upon a lever, T, which is hinged at its upper extremity to the frame of the machine, and is forked at its lower to embrace the shank which connects the disk N with its sleeve. The cam Q acts to force the disk toward the back of the machine, and thus to eject the sheaf. The disk is then returned to its first position by a spring, U, which acts upon the lever T.

From the above description of the raking and binding apparatus it will be seen that the latter must begin to act just as the rake-teeth deliver the gathered grain within the range of the arms O; hence the rake-head must make one complete trip for each revolution of the cam-shaft M, for, by one revolution of the latter the binding of the sheaf is accomplished. In order to effect this, the roller K, which puts the rake-head in motion, is driven from the cam-shaft by cog-gearing $A'$ $A^2$ $A^3$ $A^4$ $A^5$ $A^6$, whose teeth are so proportioned that the rake-chains shall make one complete revolution for each one of the cam-shaft M. The latter is fitted at its front extremity with a crown-wheel, $B^2$, having three concentric sets of teeth, $D^2$ $D^3$ $D^4$, any one of which will work with those of a pinion, $D^5$, on the shaft G. The latter is fitted with a pinion, $D^7$, which is driven by an intermediate cog-wheel, $D^8$, which gears into a cog-wheel, $D^9$, on the arbor of the driving-wheel B. The axle of the intermediate cog-wheel, $D^8$, is secured to a radius-bar, $E^2$, which can be raised to draw the wheel $D^8$ out of gear with the teeth of the driving-wheel $D^9$, or can be set in any position to be in gear with the driver $D^9$ as the latter is raised or depressed by the raising or depressing of the boxes of the arbor of the driving-wheel B. The radius-bar $E^2$ is clamped in any desired position by a clamp-screw and nut, H, the former of which is passed through a curved slot in a standard, $F^2$, on the main frame.

As motion is always imparted from the driving-wheel arbor to the shaft G through the same set of cog-wheels, the speed of the latter must always bear a fixed relation to the space traversed by the running-wheel; but as the grain growing in different places varies in quality and will produce a different number of the same-sized sheaves, it is essential that the speed of the rake and binding apparatus should be variable, so that the number of sheaves bound may be proportioned to the thickness of the standing grain. This variation in the speed of the binding and raking apparatus is effected by shifting the pinion $D^5$ along its shaft from one ring of crown-teeth to another. When the pinion is in gear with the smallest ring of teeth, $D^4$, the cam-shaft and rake will move at their fastest speed, and will turn out the greatest number of sheaves to the acre of ground; and when the pinion is in gear with the largest ring of crown-teeth the smallest number of sheaves to the acre will be turned out.

In the above description we have described a device for uniting the extremities of the cord which encircles the sheaf, by compressing them in an eyelet. This method possesses many advantages, but as it is difficult in some districts to obtain machine-made eyelets, we have invented a device by means of which the ends of that portion of the cord which surrounds the sheaf are united by tying them into a knot. This device is represented at Figs. 11 and 12, the former being an elevation and the latter a plan of the same. When this method of uniting the ends of the cord is employed, the sheaf is surrounded with cord in the manner hereinbefore specified, and the extremities of that portion which surround the sheaf are seized, as above mentioned, by nippers $f$ and spring-slide $e$. A forceps, $G^4$, is substituted for the eyelet. This forceps slides horizontally in guide $a^4$ at right angles to the plane in which the cord-finger moves. It has two jaws, $b^4 c^4$, which include a circular space, $z$, through which the cord is passed by the cord-finger. The shanks of its jaws are semi-cylindrical. The one, $g^4$, is short, and is pivoted to the other, $h^4$, which extends beyond the first. The extended part of the longer shank is cylindrical, and the shorter shank is fitted on its inner side with a spring, which tends to force it from the longer one. The shanks thus formed slide in guides $a^4$. One of these is composed of two sections, of which one is fixed, while the other, $d^4$, is moved from and toward it by means of a cam on the cam-shaft acting through the intervention of a rock-shaft, $f^4$, and arms $i^4$. When the movable section is nearest the fixed section, the two shanks of the forceps are in contact with each other and the jaws are closed. When the movable section $d^4$ of the guide is moved by the cam away from the fixed part, the shorter shank is forced from the longer one by the spring between the two, and the jaws of the forceps are opened. The forceps is moved longitudinally by a cam on the cam-shaft, acting through the intervention of a rock-shaft, $k^4$, whose extremity is fitted with a forked arm, $l^4$. The forked extremity of the latter engages with pins projected from a sleeve, $m^4$, in which the shank of the forceps turns freely. This shank is fitted with a pinion, $o^4$, whose teeth engage with those of a rack, $n^4$, which is forced from the cam-shaft by a cam thereon, and is drawn toward it by a spring. The teeth of the pinion must be sufficiently long to allow them to move with the shank without being drawn out of gear with the rack-teeth. The forceps-jaws are rounded, and a notch, $r^4$, is made in their outer extremities at right angles with the pivot which connects the two shanks of the forceps. This notch must be large enough to admit the forked extremity of a finger, $p^4$, which is moved by an arm, $q^4$, on the one extremity of a rock-shaft, $s^4$. The latter is actuated by a cam on the cam-shaft, which forces the finger $p^4$ through the notched end of the forceps, after which it is drawn back by a spring, $t^4$. The cams which actuate the different members of the device thus described are set in such positions with respect to each other and to the cam which actuates the cord-finger, that they produce the following effects, viz: As soon as the cord-finger has been raised the second time, leaving the extremities of that portion of the cord which encircles the sheaf gripped by the spring-slide $e$ and spring-nippers $f$, and passing through the circular space $z$ in the sliding forceps, the latter is moved by the cam which actuates the rock-shaft $k^4$ in the direction of the arrow $u^4$. By this movement the cord is bent, as represented at $H^4$, Fig. 13, between two fixed stops, $v^4 y^4$. The forceps is now turned three-quarters of a revolution by means of the rack $n^4$, which is now moved by its appropriate cam and acts upon the pinion $o^4$. By this operation the bent cord is twisted, as at $H^5$, Fig. 13. As soon as the twisting is effected, the forceps is moved back by the arm in a direction the reverse of the arrow $u^4$, and the twisted cord is brought into the position represented at $H^6$, Fig. 13, the notch in the end of the forceps being immediately over the forked extremity of the finger $p^4$, over which the extremities of the cord now pass. In this position the finger is projected through the notch, and carrying the cord with it places it in the position represented at $H^7$, Fig. 13. The movable section $d^4$ of the forceps-guide is now drawn from the fixed one, and the jaws of the forceps are opened by the spring between their shanks. As then the squeezers are withdrawn from the sheaf, the latter in expanding draws the cord from the forked finger $p^4$ and tightens the knot, which, when thus completed, is represented at $H^8$, Fig. 13. The cams which effect these different movements are all fixed to the same cam-shaft to which the squeezer and arm-cams are secured.

It is obvious that the harvesting-machine herein described is merely an exemplification of the principle, method, or mode of operation by which grain may be cut and bound into sheaves by machinery without the aid of manual labor. The machinery for carrying this method or mode of harvesting grain into effect admits of almost endless variation in the structure and arrangement of its parts, one arrangement being preferable to another from its cheapness and durability or from its less liability to get out of working order. Therefore, although machines may be constructed of different forms and arrangement, and of varying excellence, yet so long as they gather the cut grain into a sheaf or bundle, encircle this sheaf with a band, and unite the ends of the band, they would manifestly effect the same object as the machinery herein described by the same general mode of operation. As this point is self-evident, it will be unnecessary for us here to describe in detail the many mechanical devices we have devised to effect the cutting, gathering, and binding of grain into a sheaf; but in order that others may be enabled to modify the machine to suit the circumstances of some particular cases we will specify some of these modifications which we consider most likely to be required.

In place of making the cutting apparatus adjustable with respect to the binder, it may be advantageous in some cases to make the latter adjustable with respect to the former.

The binding apparatus may be placed in a horizontal instead of in the vertical position in which it is represented at Fig. 1, and some of the devices may be actuated by the others, instead of being independently actuated by a single cam-shaft.

The motion of the binding apparatus may also be derived from that of the rake, instead of the latter being derived from the former.

The ends of the band round the sheaf may be united by compressing them within a coiled or bent slip or ribbon of metal, or a piece of wire, which is cut from a coil and bent or riveted by the action of the machine; or the ends may be united by an adhesive cement, which may be caused to set quickly by the application of a heated iron.

The binding apparatus, being independent of the cutting and raking apparatus, may with advantage be applied to many of the harvesting-machines now in use, or it may be used in connection with a rake to bind grain which has been cut and left in the swath by a mowing-machine.

In the foregoing description we might have described the manner of applying our invention to the uniting of straw bands; but it is believed that the waste of grain incident to their employment would exceed the cost of binding-cord, which has the advantage of being a much less cumbrous material.

The invention we have described is not only applicable to the binding of grain, but to the binding of other substances into bundles—as, for example, hemp, brush-wood, &c.—and we contemplate its application to these and like purposes wherever advantages would result from its employment. In such cases it may be expedient to make the binding apparatus stationary, to drive it by some suitable power, and to feed to it the brush-wood to be bound by means of an endless apron.

Having thus specified our improvements in harvesting-machines, what we claim as our invention, and desire to secure by Letters Patent, is—

1. The method of raking and binding grain at one operation by the mechanism herein specified, or its equivalent, substantially as herein set forth.

2. The arms $m$, in combination with the levers $r$, by means of which the rake-teeth are alternately raised and depressed as the rake is moved alternately in opposite directions by endless rake-chains, which move continually in the same direction.

3. The method of adapting the binding apparatus to the length of the cut grain by varying the respective positions of the cutting and binding apparatus, substantially as herein set forth—that is to say, by moving the front of the platform, with the cutting apparatus, backward or forward, or by moving the binding apparatus nearer to or farther from the front of the platform in such manner that the sheaf may be bound near the middle of its length, whether it be long or short.

4. The method of binding grain by the mechanical devices herein specified, or their equivalents, acting in connection and automatically by motion derived from or dependent upon the movement of the machine to which they are attached.

5. The cord-finger B, operating substantially as herein set forth, by the aid of which the grain is encircled by the binding-cord.

6. The tying-forceps, or the equivalent thereof, operating in connection with mechanism for encircling the grain with cord or band, substantially as herein set forth.

In testimony whereof we have hereunto subscribed our names.

WILLIAM WATSON.
E. SABINE RENWICK.
P. HILL WATSON.

Witnesses:
T. C. DONN,
CLEM. S. STEELE.